W. J. UEBLER.
MILKING MACHINE.
APPLICATION FILED APR. 7, 1911.
1,112,949.
Patented Oct. 6, 1914.
3 SHEETS—SHEET 1.
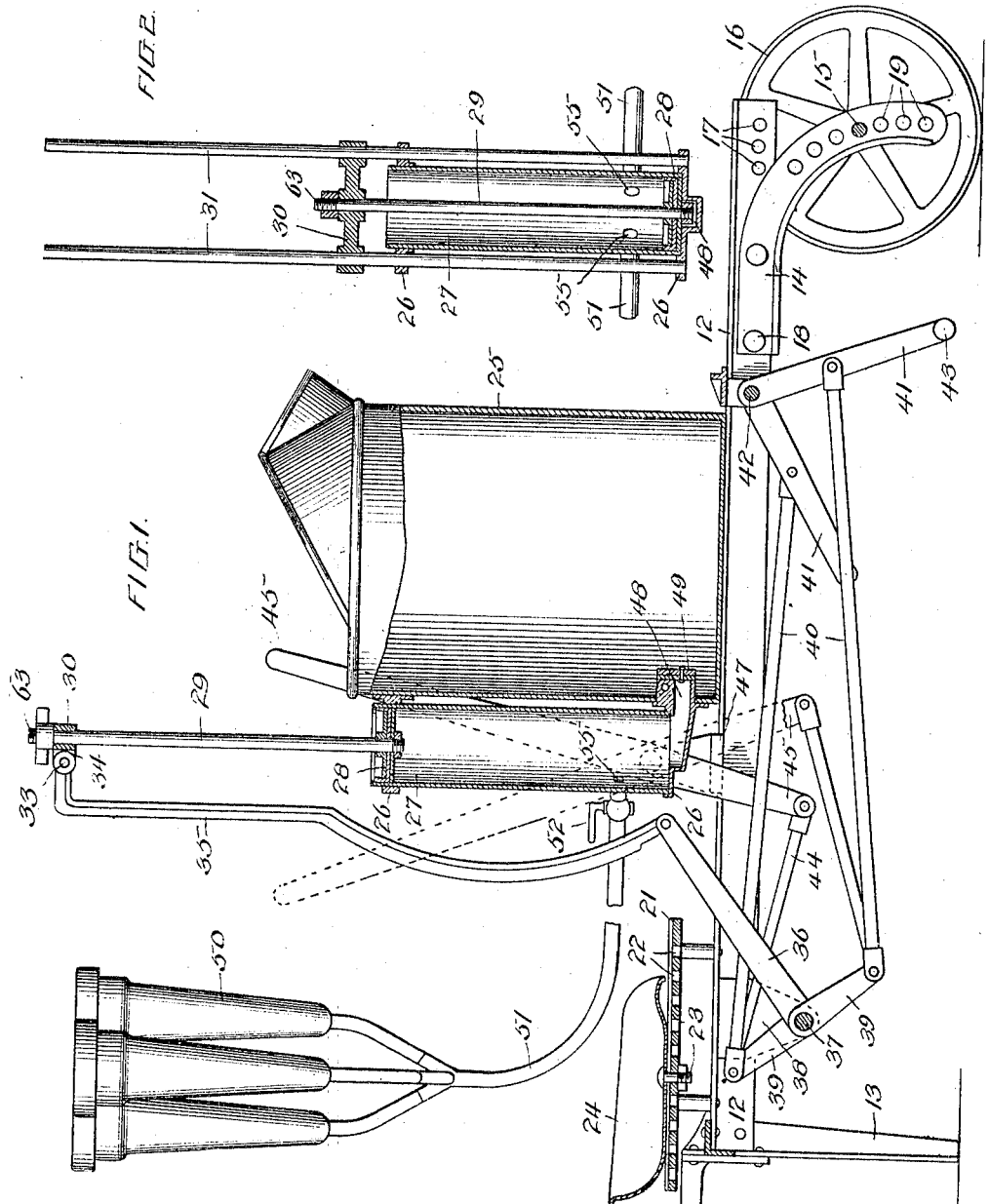

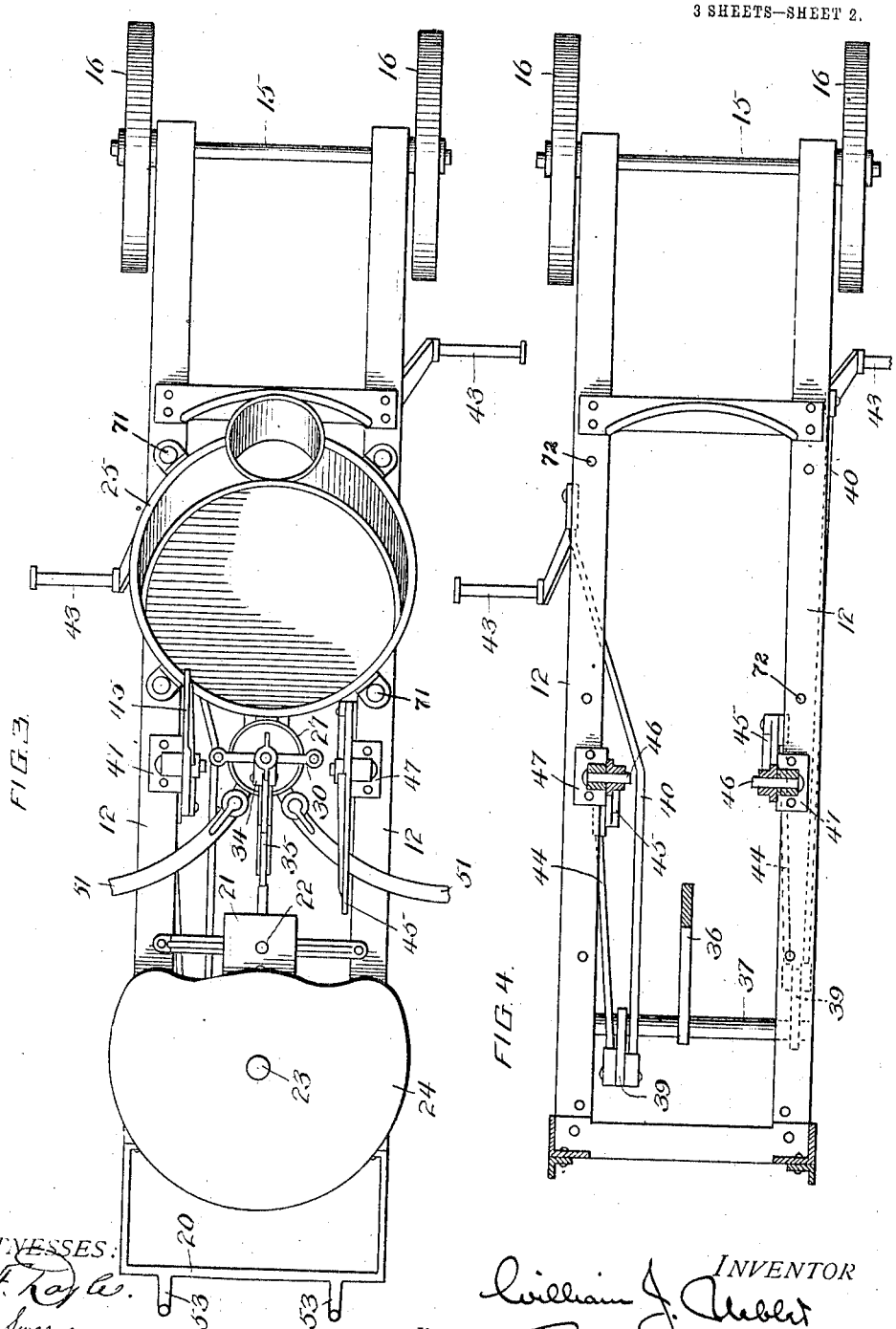

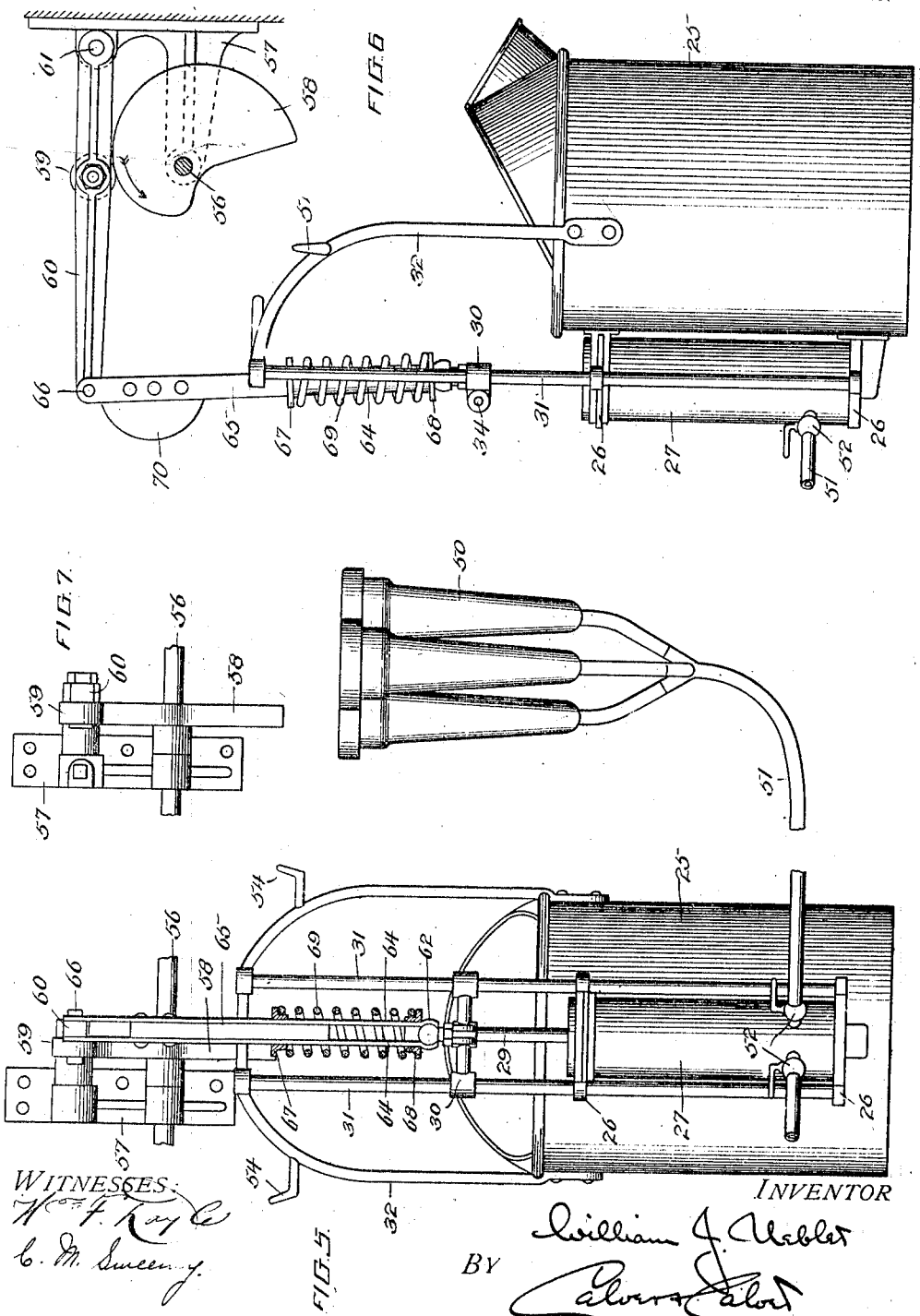

UNITED STATES PATENT OFFICE.

WILLIAM J. UEBLER, OF WEST SCHUYLER, NEW YORK.

MILKING-MACHINE.

1,112,949.   Specification of Letters Patent.   Patented Oct. 6, 1914.

Application filed April 7, 1911. Serial No. 619,517.

*To all whom it may concern:*

Be it known that I, WILLIAM J. UEBLER, a citizen of the United States, residing at West Schuyler, in the county of Herkimer and State of New York, have invented or discovered certain new and useful Improvements in Milking-Machines, of which the following is a specification reference being had therein to the accompanying drawings.

This invention relates to milking machines and has reference more particularly to machines of the type in which the differential fluid pressures for performing the milking operations are generated as required by mechanism forming a part of the machine itself and actuated mechanically, as distinguished from those machines which are automatically actuated by and operate to control differential fluid pressures supplied thereto.

The objects of the invention, together with means whereby the same may be carried into effect, will best be understood from the following description of one form or embodiment thereof illustrated in the accompanying drawings. It is to be understood, however, that the construction described and shown has been chosen for illustrative purposes merely, and that the invention may be embodied in other forms without departing from the spirit and scope thereof.

In said drawings: Figure 1 is a longitudinal sectional view of the machine adjusted for manual operation. Fig. 2 is a vertical section of the pump cylinder and piston, taken at right angles to Fig. 1 and showing the piston in a different position. Fig. 3 is a plan view of the parts shown in Fig. 1. Fig. 4 is a similar view, partly in section, with the seat, the milk receptacle, and the pump removed. Figs. 5 and 6 are elevations at right angles to one another of the milk receptacle and pump connected for power operation. Fig. 7 is an elevation of the operating cam and lever with the connecting rod removed.

12 denotes a frame of suitable construction provided at one end with supporting legs or uprights 13 and at the opposite end with depending arms 14, between which extends an axle 15 on which are mounted wheels 16. The longitudinal frame members are preferably provided each with a plurality of apertures 17 for the reception of bolts 18 by which the arms 14 are secured to the frame, this arrangement permitting the position of the arms 14 longitudinally of the frame to be varied at will. The axle 15 is arranged to be received in any pair of a series of apertures 19 formed in the arms 14, whereby the height of the frame 12 when resting upon the wheels 16 may be adjusted. The frame is provided with a handle 20 by which the machine may be moved from place to place upon the wheels 16.

Mounted upon the frame 12 is a base 21 having a series of apertures 22 adapted to receive a bolt 23 for the attachment of a seat 24, said bolt being adapted to be received in any one of said apertures, whereby the position of the seat longitudinally of the frame may be adjusted.

Supported on the frame 12 is a milk receptacle 25, to which is attached, as by brackets 26, a pump cylinder 27 having its upper end in communication with the atmosphere. Within said cylinder is a preferably solid piston 28 connected by a piston rod 29 with a cross-head 30 guided on rods 31. The rods 31 are supported by the brackets 26 and may, if desired, be further supported at their upper ends by a bail or upright 32 secured to the milk receptacle 25 as shown in Figs. 5 and 6.

It is one object of the invention to provide milking mechanism capable of use either as a portable, manually operated machine or as a power driven machine when used in localities where suitable power is available.

To this end the machine comprises connections and operating devices which will be described.

In Figs. 1 to 4 the parts are shown connected for manual operation. Secured to the cross-head 30, preferably in a detachable manner, as by a removable pin 33 passing through ears or lugs 34 projecting from the cross-head, is a pitman 35 pivoted at its lower end to an arm 36 fixed on a rock shaft 37 journaled in brackets 38 secured to the frame 12. Fixed to the rock shaft 37 are other arms 39 connected by rods 40 with treadle levers 41 pivoted on studs 42 projecting from the frame 12, said levers carrying treadles 43. The arms 39 are connected by other rods 44 with hand levers 45 pivoted on studs 46 projecting from brackets 47 secured to the frame 12. By this mechanism the piston 28 may be reciprocated either by hand or foot power or, preferably, by both, making the labor of operating the machine very light. Moreover the mechanism is preferably so arranged that when a foot lever 41 on one side of the machine is moving forwardly the hand lever on the same side, as well as the foot lever on the opposite side, is moving rearwardly, and vice versa, making the movement of the operator's body and limbs a balanced and natural one.

Communicating with the lower end of the cylinder 27 is a milk passage 48 preferably formed in the lower bracket 26 leading to the milk receptacle 25 and controlled by a check valve 49 opening toward said receptacle. 50 denotes the teat cups, which may be of any suitable form or type, but which I have herein illustrated as of the form described and shown in my application for Letters Patent filed Feb. 25, 1911, Serial No. 610,888. These teat cups are arranged in the usual sets of a suitable number each, each set being connected by a milk pipe 51, controlled if desired by a suitable cock 52, with the cylinder 27. When not in use the teat cups may be supported by any suitable means, as by hooks 53 projecting from the handle 20 as shown in Figs. 1 and 3, or by hooks 54 projecting from the upright 32 as shown in Figs. 5 and 6. The milk pipes 51 terminate in ports 55 in the cylinder 27 which are located above the bottom of said cylinder or at points intermediate the limits of movement of the piston 28.

The milking operation is as follows: When the piston 28 starts on its upward stroke from the position shown in Fig. 2, the check valve 49 will close and a partial vacuum will at once be formed in the milk passage 48 and in the cylinder 27 below the piston. When the piston passes the ports 55 on its upward movement this partial vacuum is at once communicated to the teat cups through the pipes 51 causing suction to be applied to the teats. Thereafter as the piston continues to rise the milk will be drawn through the pipes 51 and will run into the lower end of the cylinder 27 below the ports 55. More or less air will, at the same time, be drawn through the teat cups and pipe 51 into the cylinder 27. When the piston descends the suction in the teat cups is relieved and may even, by reason of the air drawn into the cylinder 27 on the upward stroke of the piston, be converted into compression as said piston approaches the ports 55 on its downward stroke. After the piston passes the ports 55 on its downward movement these ports are placed in communication with the atmosphere, and any remaining suction or compression in the teat cups completely relieved. Thereafter as the piston continues to descend the milk in the lower end of the cylinder will be forced into the milk receptacle.

It will be seen that from the beginning of the upward stroke of the piston a partial vacuum is formed in the lower end of the cylinder, without the necessity of exhausting any considerable dead air space, and that this partial vacuum is at once communicated to the teat cups when the piston passes the ports 55. It will also be noticed that the pipes 51 are in permanent communication with the interior of the cylinder 27, there being no check valves or other devices acting normally to control this communication, it being understood that the cocks 52 are mere hand operated devices to isolate any set of teat cups which may be out of use. After the completion of a suction period caused by the upward movement of the piston, the subsequent downward movement of the piston causes the suction in the teat cups to be relieved. Moreover, for a certain period in each cycle of operations of the machine, namely, during the time when the piston is below the ports 55, the teat cups are completely vented to the atmosphere, the piston 28 itself serving as a valve for the ports 55 to control this operation. By these provisions all possibility of an accumulation of suction in the teat cups is prevented. A serious objection to machines of this general type as heretofore proposed has been that continuous suction was applied to the teats. As will be seen this objection is effectually overcome by the present invention.

In Figs. 5 to 7 are shown, in operative position, the connections whereby the machine may be operated by power. 56 denotes a power shaft journaled in bearings carried by brackets 57 suitably supported, as by the wall of a barn or other building. 58 denotes a cam mounted on the shaft 56 and coöperating with a roller 59 carried by a lever 60 pivoted at 61 to one of the brackets 57. The cam 58 is preferably of substantially the form shown in order to give to the piston 28 a relatively slow upward movement and a relatively quick downward movement in order to provide a relatively long suction period and a relatively quick relief of the suction. Where a plurality of cams 58 are employed in order to operate a number of machines simultaneously these cams are preferably arranged with their high points in different angular positions on the shaft 56 in order to distribute the load on said shaft. 62 denotes a preferably substantially spherical knob attached to the piston rod 29 or to the crosshead 30, preferably by screwing the same upon the threaded end 63 (Figs. 1 and 2) of the piston rod projecting above said crosshead. The knob 62 is embraced by a pair of flexible socketed arms 64 carried by a connecting rod 65 pivoted at 66 to the lever 60. 67 denotes a collar fast on the connecting rod 65 and 68 a collar slidably mounted on the arms 54 and between which collars is interposed a spring 69. Normally the collar 68 holds the arms 64 in engagement with the knob 62. To disconnect the piston rod 29 from the connecting rod 65 the collar 68 is raised against the tension of the spring 69 and the arms 64 separated to release the knob 62. 70 denotes a weight carried by the connecting rod 65 to cause the downward movement of the piston 28 when permitted by the cam 58. A weight is preferable for this purpose to a spring for the reason that the maximum power is required at the time when the piston approaches the lower limit of its stroke, at which time a spring would exert its minimum force. The force of a weight, however, will be substantially constant, or if anything greater as the lower limit of its movement is approached due to its momentum.

The machine is converted from manual to power operation as follows: The pin 33 is first removed to disconnect the pitman 35 from the cross-head 30 and the knob 62 is screwed upon the upper end of the piston rod 29. In this connection it is to be noted that the knob 62 may, if desired, be left permanently in place upon the piston rod 29, or even formed integral therewith, as it in no way interferes with the manual operation of the machine and is detachably connected with the connecting rod 65. The collar 68 is then raised, the arms 64 slipped into place over the knob 62, and the collar again released. If necessary in order to bring the parts into proper vertical adjustment, the position of the axle 15 on the arms 14 may be raised or lowered, which will position the machine vertically with respect to the shaft 56 and lever 60. In order to steady the machine it may be desirable to rest the wheels 16 against the wall by which the brackets 57 are supported, and if any horizontal adjustment is necessary in order to bring the piston rod 29 into proper alinement with the connecting rod 65, such adjustment may be effected by varying the position of the arms 14 on the longitudinal members of the frame 12.

The milk receptacle 25 is preferably detachably connected to the frame 12, as by bolts or screws 71 (Fig. 3) entering openings 72 (Fig. 4) in the longitudinal frame members. If desired, therefore, when the power operating mechanism shown in Figs. 5 and 6 is used, this receptacle, together with the pump, may be removed from the frame 12 and placed upon the floor or any other suitable support.

Having thus described my invention I claim and desire to secure by Letters Patent:

1. In a milking machine the combination with milking mechanism, of operating mechanism therefor comprising a pair of oppositely arranged treadles, a pair of oppositely arranged hand levers corresponding to said treadles, and mechanism for operatively connecting said treadles and levers with said milking mechanism, said means being constructed and arranged to cause said treadles and levers in each pair to move in opposite directions and to cause each treadle and the corresponding lever to move in opposite directions.

2. In a milking machine the combination with milking mechanism including a reciprocating part, of mechanism for reciprocating said part comprising a pair of treadle levers, a pair of hand levers, a rock shaft, a pair of arms on said rock shaft, a pair of connecting rods connecting each of said arms with one of said treadle levers, and with the corresponding hand lever, a third arm on said rock shaft, and a pitman connecting said last named arm with said reciprocating part.

3. In a milking machine the combination with portable manually operated milking mechanism, of separate power operating mechanism therefor, and means for detachably connecting said power operating mechanism and milking mechanism.

4. In a milking machine the combination with milking mechanism, of manual operating mechanism therefor, power operating mechanism therefor, means for detachably connecting said manual operating mechanism and said milking mechanism, and means for detachably connecting said power operating mechanism and said milking mechanism.

5. In a milking machine the combination with manually operated milking mechanism including a reciprocating part provided with a knob, of separate power operated mechanism for reciprocating said part, a connecting rod operated by said power mechanism and provided with a pair of separable arms adapted to embrace said knob, and means for holding said arms in engagement with said knob.

6. In a milking machine the combination with a piston, a piston rod, and manual operating mechanism for said piston rod, of a knob in threaded engagement with said piston rod, separate power operating mechanism, a connecting rod operated by said power mechanism and provided with a pair of separable arms adapted to embrace said knob, and a collar slidably mounted on said arms.

7. In a milking machine the combination with milking mechanism, including a reciprocating part provided with a knob, of manual operating mechanism therefor including a pitman detachably connected to said part, and power operating mechanism therefor including a connecting rod provided with a pair of separable arms adapted to embrace said knob.

8. In a milking machine the combination with milking mechanism including a reciprocating piston, of mechanical means for giving to said piston a relatively slow movement in one direction and a relatively rapid movement in the opposite direction.

9. In a milking machine, the combination with milking mechanism including a teat cup, a cylinder, and a piston in said cylinder movable in one direction to apply suction to said teat cup and in the opposite direction to relieve said suction, of means for giving to said piston a relatively slow suction stroke and a relatively rapid relief stroke.

10. In a milking machine, the combination with milking mechanism comprising a teat cup, a cylinder, and a piston in said cylinder movable in one direction to apply suction to said teat cup and draw milk into said cylinder and in the opposite direction to relieve said suction and force said milk out of said cylinder, of a cam for moving said piston in said first named direction and a weight for moving said piston in said last-named direction.

11. In a milking machine the combination of a portable frame, milking mechanism carried by said frame, stationary power operating mechanism for said milking mechanism, means for detachably connecting said operating mechanism and milking mechanism, and means for adjusting said frame.

12. In a milking machine the combination of a portable frame, milking mechanism carried by said frame, stationary power operating mechanism for said milking mechanism, means for detachably connecting said operating mechanism and milking mechanism, and wheels for supporting said frame, said frame being adjustably mounted on said wheels.

13. In a milking machine the combination with a teat cup, of means for forming a partial vacuum and thereafter placing said teat cup in communication therewith.

14. In a milking machine the combination with a teat cup, of a suction chamber and means for forming a partial vacuum therein and thereafter placing said teat cup in communication therewith.

15. In a milking machine, the combination with a teat cup and a milk chamber in communication therewith, of means for forcing milk out of said milk chamber and venting said teat cup to the atmosphere.

16. In a milking machine the combination with a teat cup and a chamber, of means movable in one direction to form a partial vacuum in said chamber and thereafter to place said teat cup in communication therewith, and in the opposite direction to force milk out of said chamber and vent said teat cup to the atmosphere.

17. In a milking machine, in combination, a cylinder, a reciprocating piston in said cylinder, a teat cup, and a pipe leading from said teat cup and communicating with said cylinder at a point intermediate the limits of movement of said piston.

18. In a milking machine, in combination, a milk receptacle, a cylinder, a milk passage leading from said cylinder to said receptacle and provided with a check valve opening toward said receptacle, a reciprocating piston in said cylinder, a teat cup, and a pipe leading from said teat cup and communicating with said cylinder at a point intermediate the limits of movement of said piston.

19. In a milking machine, in combination, a milk receptacle, a cylinder, a milk passage leading from the bottom of said cylinder to said receptacle and provided with a check valve opening toward said receptacle, a reciprocating piston in said cylinder, a teat cup, and a pipe leading from said teat cup and communicating with said cylinder at a point intermediate the limits of movement of said piston.

20. In a milking machine, in combination, a teat cup, a cylinder, and a piston in said cylinder movable in one direction to form a partial vacuum in one end of said cylinder and thereafter place said teat cup in communication therewith.

21. In a milking machine, in combination, a teat cup, a cylinder, and a piston in said cylinder movable in one direction to form a partial vacuum in one end of said cylinder and thereafter place said teat cup in communication therewith to draw milk into said cylinder, said piston being movable in the opposite direction to relieve said partial vacuum and force said milk out of said cylinder.

22. In a milking machine, in combination, a teat cup, a cylinder in communication with the atmosphere, and a piston in said cylinder movable in one direction to apply suction to said teat cup and draw milk into said cylinder and in the opposite direction to force said milk out of said cylinder and vent said teat cup.

23. In a milking machine, in combination, a cylinder having its upper end in communication with the atmosphere, a reciprocating piston in said cylinder, a teat cup, and a pipe leading from said teat cup and communicating with said cylinder at a point above the lower limit of movement of said piston.

24. In a milking machine, in combination, a teat cup, a cylinder, a reciprocating piston in said cylinder, a pipe leading from said teat cup and in permanent communication with said cylinder, said pipe terminating in a port intermediate the limits of movement of said piston, and a milk passage leading from said cylinder and provided with a check valve.

25. In a milking machine, the combination with a milk receiving teat cup, of means for applying suction to said teat cup and for thereafter forcing air into said teat cup.

26. In a milking machine, the combination with a milk receiving teat cup, of a cylinder, a pipe leading from said teat cup and having uninterrupted communication with said cylinder, and a solid reciprocating piston in said cylinder.

27. In a milking machine, the combination with a milk receiving teat cup, of means for forming a partial vacuum, for thereafter placing said teat cup in communication therewith, and for finally forcing air into said teat cup.

28. In a milking machine, the combination with a milk receiving teat cup and a milk chamber in communication therewith, of means for forcing milk out of said milk chamber and forcing air into said teat cup and for thereafter venting said teat cup.

In testimony whereof I affix my signature, in presence of two witnesses.

WILLIAM J. UEBLER.

Witnesses:
 RUTH B. GOODWIN,
 SADIE G. UEBLER.